United States Patent Office 3,278,423
Patented Oct. 11, 1966

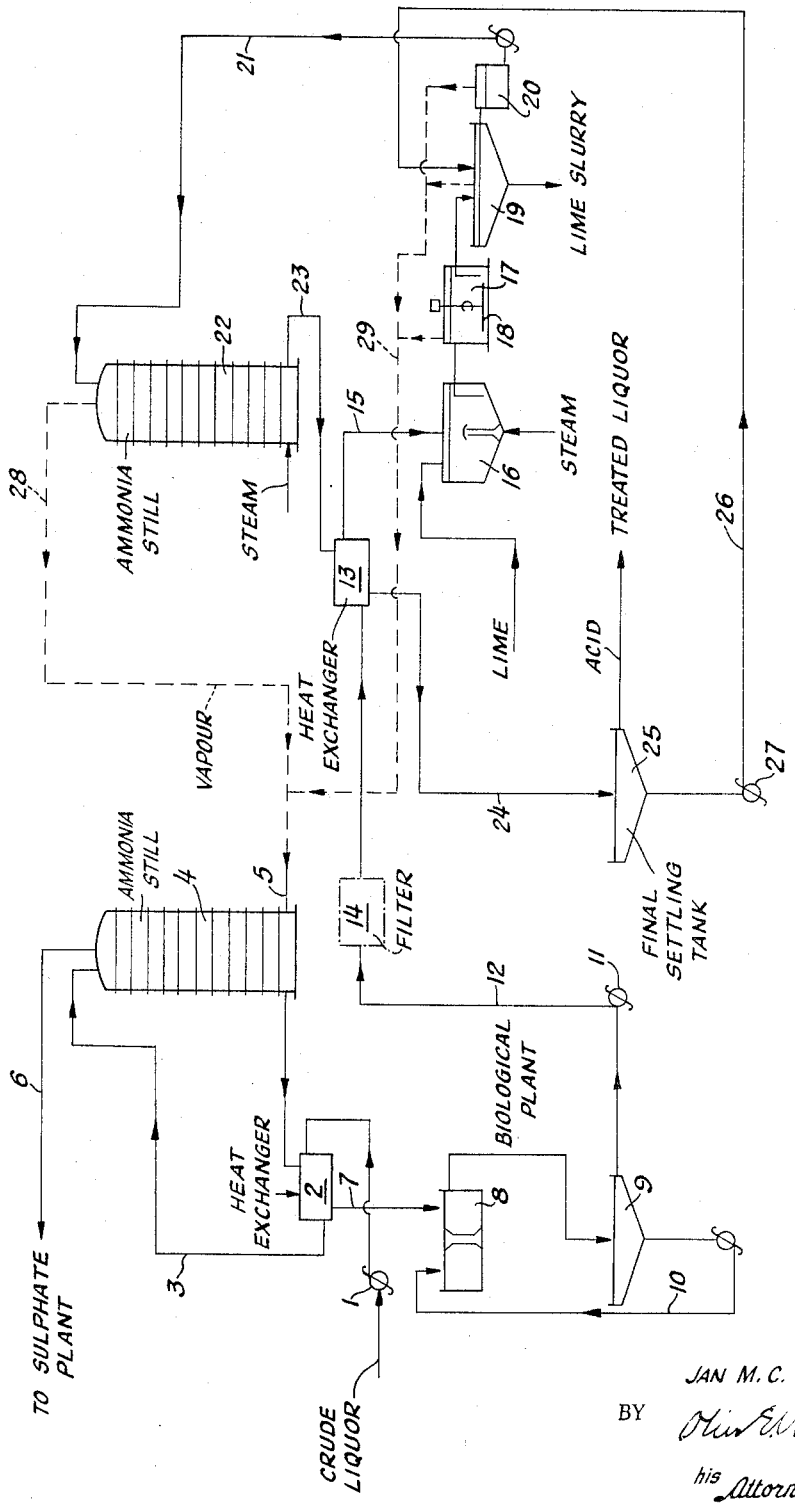

3,278,423
PROCESS FOR THE TREATMENT OF AQUEOUS CRUDE EFFLUENT LIQUORS FROM COAL CARBONIZING PLANTS
Jan Michael Courtney Millar, Crawley, Sussex, England, assignor to Woodall-Duckham Construction Company Limited, Crawley, England, a British company
Filed Sept. 17, 1964, Ser. No. 397,241
Claims priority, application Great Britain, Sept. 17, 1963, 36,585/63
3 Claims. (Cl. 210—15)

This invention concerns improvements in or relating to the treatment of industrial effluents, for example aqueous effluent liquors from coal carbonising plants, and is particularly concerned with processes for reducing the noxious or toxic properties of the liquors and thereby rendering them suitable for discharge into rivers or drainage systems.

The effluent liquors with which the invention is concerned may for example be derived from gas works operating with vertical and/or horizontal retorts or from coke oven plants and contain both free and fixed ammonia.

When treating such effluent liquors, it is common practice to distill the ammonia from the crude liquor with lime. However, owing to the fouling of the trays by lime solids, which also causes ammonia to be evolved in the lower trays just before discharge of the liquor, there is still an ammonia residue, not easily reduced below about 200 p.p.m.

The waste liquor from the ammonia still can then be subjected to biochemical oxidation to remove phenols, thiocyanates and thiosulphates by bringing bacteria capable of destroying these toxic constituents into contact with the liquor under suitable conditions, this oxidation step requiring approximately 150 p.p.m. of ammonia for use as nutrient by the bacterial. This amount of residual ammonia is not always acceptable in some countries for effluents discharged for example into rivers, and moreover the biochemical oxidation of ammonia produces nitrates which are also not always acceptable for discharge into rivers.

In an endeavour to reduce the noxious properties of effluent liquors it has previously been proposed to treat the liquor by first removing therefrom free ammonia by distillation, then subjecting the liquor to biochemical oxidation and finally removing the fixed ammonia by distillation with lime.

It is an object of the present invention to provide an improved process for the treatment of aqueous effluent liquors to reduce the ammonia content thereof.

According to one aspect of the invention there is provided, in a process for the treatment of effluent liquors from coal carbonising plants, the steps of adding lime external to any ammonia still, to effluent liquor which has previously had at least the major part of the free ammonia removed therefrom and thereby converting the fixed ammonia salts to free ammonia salts, separating all or substantially all the solids from the limed effluent, and then distilling the effluent to remove the ammonia salts.

According to a further aspect of the invention there is provided a process for the treatment of aqueous effluent liquors from coal carbonising plants, which comprises distilling the liquor to remove at least the major part of the free ammonia, subjecting the resulting liquid to biochemical oxidation, adding lime to the thus treated liquor to convert the fixed ammonia salts to free ammonia salts, separating all or substantially all the solids from the limed effluent, and then distilling the liquor to remove the ammonia salts.

According to a further feature of the invention, the said solids may be removed from the limed effluent by allowing the mixture to gravitate in a settling tank from which excess lime and/or other solids may be removed as a sludge.

It is another object of the invention to provide apparatus for use in carrying out the process of the invention, and, according to another aspect of the invention, there is provided apparatus comprising in combination a first ammonia still for distilling aqueous effluent liquor from coal carbonising plants to remove the major part of the free ammonia from the said liquor, a biochemical oxidation plant for the removal of phenols, thiocyanates and thiosulphates from the thus treated liquor, a heat exchanger for heating effluent liquor from the said biochemical oxidation plant, a mixing tank for the heated effluent liquor, means being provided for passing steam and lime into such tank, a settling tank to which the mixture from the mixing tank may be passed, and means for passing the supernatant liquor from the settling tank to a second ammonia still in which the free ammonia can be distilled.

Conveniently the liquor is heated by a heat-exchanger and by the addition of steam, to a temperature of 100° C., which steam also serves to agitate the mixture of lime and liquor. Under these conditions it is found that the conversion of the fixed ammonia salts to free ammonia salts takes 20–30 minutes.

In order that the invention may be more readily understood, one embodiment of the same together with a modification will now be described by way of example and with reference to the accompanying drawing which diagrammatically illustrates the process and apparatus of the embodiment of the invention.

In this embodiment crude effluent liquor from a coal carbonising plant is pumped using a pump 1 via a first heat exchanger 2 through a line 3 to the top of a first ammonia still 4 in which the liquor is stripped of free ammonia by means of steam which is introduced via line 5 into the bottom of the still 4. In this way the free ammonia present in the crude liquor is reduced to an appropriate concentration (about 300 p.p.m.) which will enable the liquor satisfactorily to be subjected to a biochemical treatment which will be referred to hereinafter. The ammonia and steam together with hydrogen sulphide and carbon dioxide released from the crude liquor are passed from the first ammonia still 4 to a sulphate or di-ammonium phosphate plant (not shown) through a pipe 6.

The waste liquor from the first ammonia still 4 is then cooled to a temperature in the range 30° C. to 60° C. by passing it through the first heat exchanger 2 where it preheats the incoming crude liquor and the cooled waste liquor is then fed via a line 7 to a biochemical oxidation plant for the removal of phenols, thiocyanates and thiosulphates.

The biochemical oxidation plant consists principally of a sludge tank or tanks 8 in which bacteria capable of destroying the toxic constituents are brought into contact with the liquor and one or more settling tanks 9 where separation of the activated sludge is brought about by gravity, the sludge separating in such settling tank or tanks being recycled as indicated at 10 to the sludge tank or tanks 8 and the supernatant effluent liquor being passed to the next stage of the process.

Thus following treatment in the said biochemical oxidation plant (this step of the process taking about 24 hours) the supernatant effluent liquor from the settling tank or tanks 9 is passed by means of a pump 11 via a line 12 through a second heat exchanger 13 to raise the temperature of the liquor to approximately 60° C. to 80° C.

If desired a coke, sand or the like pressure filter 14 may be provided in the line 12, as indicated in dot and pick lines, to remove any suspended solids, but tests have shown that heat transfer within the heat exchanger 13 is not affected by the deposit of any such suspended solids so that normally the filter need not be used.

The heated liquor is then passed via a line 15 to a mixing tank 16 into which about 20% excess lime slurry is introduced together with steam which is passed upwardly through the mixture, the steam serving to agitate the mixture and raise the temperature to 100° C. The mixture is then passed to a second mixing tank 17 provided with a rotatable agitator or paddle 18. The fixed ammonia salts are thereby converted to free ammonia salts which can be removed by subsequent steam stripping as will hereinafter be described.

After sufficient time (about 30 minutes) for the conversion to take place, the mixture is passed to a small primary settling tank 19 with a retention time of 30 to 60 minutes where gravitational separation takes place, most (i.e. approximately 97%) of the excess lime and other solids settling in the form of a sludge at the bottom of the tank from which the sludge can be removed and disposed of for example on vacuum filters or on drying beds as required.

The supernatant liquor from the main settling tank is passed to a supply tank 20 from which it is pumped via a line 21 to a second ammonia still 22 to which steam is admitted to distill the free ammonia leaving a very small amount (approximately 10 p.p.m.) in the effluent.

The total steam required will be 2.5 to 3.0 lbs. per gallon of liquor to achieve the above-mentioned ammonia figure.

The waste liquor from the second ammonia still 22 is passed via a line 23 through the second heat exchanger 13 thereby serving to heat the liquor from the biochemical oxidation plant.

Finally the liquor may be passed via a line 24 through a further or final settling tank 25 with a retention time of about 4 hours to ensure removal of any remaining suspended solids before the effluent liquor is discharged. Any solids settling in the further settling tank 25 are recycled via a line 26 to the primary settling tank 19 using a pump 27.

The effluent liquor—before being finally discharged—may be subjected to additional purification. For example, it may be passed through activated carbon or treated with ozone, so as further to reduce the permanganate value; moreover its pH value may be corrected by addition of acid.

The above described embodiment of the invention may advantageously be modified, as indicated by the broken lines 28, by using the steam-containing vapour leaving the top of the said second still for carrying out the distillation in the first ammonia still. Moreover the vapour arising from the second mixing tank 17, the primary settling tank 19 and the supply tank 20 may also be delivered via line 29 to the same place.

The following examples are set out to contrast the results of the process of the present invention with the results obtained by using known methods of distilling ammonia from the crude liquor.

Example 1

Tests were carried out on two existing standard ammonia stills where liming is practised. Final ammonia figures varied and were affected by pitch deposits in the stills, being better when the stills were clean.

Variations in lime addition allow ammonia to be released in the lower trays of the fixed still, thus causing high free ammonia figures in the effluent.

TYPICAL RESULTS

| Test | 2 | 6 | 7 | 8 | 12 |
|---|---|---|---|---|---|
| Still | I | I | II | II | I |
| Steam/liquor ratio, lb./gal | 3.2 | 4.5 | 2.87 | 2.09 | 3.4 |
| Lime-Stoichiometric percentage added | nil | 135 | 175 | 155 | 73 |
| Effluent ammonia: | | | | | |
| Free, gm./100 ml | nil | 0.030 | 0.009 | 0.052 | 0.011 |
| Fixed, gm./100 ml | 0.478 | nil | 0.003 | trace | 0.001 |

Example 2

Typical results from another standard still using lime to distill the liquor were as follows:

| Test | 1 | 2 | 3 | 10 |
|---|---|---|---|---|
| Still | III | III | III | III |
| Steam/liquor ratio, lb./gal | 2.11 | 1.69 | 2.15 | 2.15 |
| Lime-Stoichiometric percentage added | 80 | 106 | 86 | 128 |
| Effluent ammonia: | | | | |
| Free, gm./100 ml | 0.010 | 0.050 | 0.000 | 0.042 |
| Fixed, gm./100 ml | 0.187 | 0.172 | 0.138 | 0.000 |

Example 3

Typical results from another standard still without provision for liming but with more trays.

| Test | 1 | 2 | 5 | 6 |
|---|---|---|---|---|
| Liquor, g.p.h | 2,200 | 2,465 | 2,500 | 2,500 |
| Steam/liquor ratio, lb./gal | 2.66 | 2.07 | 1.05 | 1.37 |
| Effluent ammonia: Free gm./100 ml | nil | nil | 0.0036 | nil |

It will be appreciated that, since liming was not practised in this example, the fixed ammonia originally in the crude liquor treated remained in the effluent and was not liberated as free ammonia.

I claim:

1. A process for the treatment of aqueous crude effluent liquors from coal carbonising plants, which comprises distilling said crude liquor to remove at least the major part of the free ammonia, subjecting the resulting crude waste liquor to biochemical oxidation, adding lime to the thus treated crude waste liquor to convert the fixed ammonia salts to free ammonia salts, separating all or substantially all the solids from the limed crude waste liquor, and then distilling the supernatant liquor to remove the ammonia salts.

2. The process according to claim 1 wherein the solids are removed from the limed crude waste liquor by allowing the mixture to gravitate in a settling tank from which excess lime and other solids may be removed as a sludge.

3. Apparatus for carrying out the process of claim 1, comprising in combination a first ammonia still for distilling aqueous effluent liquor from coal carbonising plants to remove the major part of the free ammonia from the said liquor, a biochemical oxidation plant for the removal of phenols, thiocyanates and thiosulphates from the thus treated liquor, a heat exchanger for heating effluent liquor from the said biochemical oxidation plant, a mixing tank for the heated effluent liquor, means being provided for passing steam and lime into such tank, a settling tank to which the mixture from the mixing tank may be passed, means for passing the supernatant liquor from the settling tank to a second ammonia still in which the free ammonia can be distilled, and means for feeding the liquor from each treatment means recited to the succeeding treatment means.

References Cited by the Examiner

Chemistry of Coal Utilization, Committee on Chemical Utilization of Coal, National Research Council, 1945, John Wiley & Sons, New York, pp. 1371–1375, 1379–1381, 1389–1393, 1395–1396, 1426–1437 and 1468 relied on.

MORRIS O. WOLK, *Primary Examiner.*

MICHAEL E. ROGERS, *Examiner.*